United States Patent [19]

Doumae et al.

[11] Patent Number: 5,431,768
[45] Date of Patent: Jul. 11, 1995

[54] BONDING DEVICE AND BONDING PROCESS FOR FABRICATING AN INTERIOR COMPONENT

[75] Inventors: Masao Doumae; Hisashi Yamada; Fumihiko Saito, all of Kanagawa, Japan

[73] Assignee: Kasai Kogyo Co., Ltd., Tokyo, Japan

[21] Appl. No.: 97,929

[22] Filed: Jul. 28, 1993

Related U.S. Application Data

[63] Continuation of Ser. No. 871,423, Apr. 21, 1992, abandoned.

[30] Foreign Application Priority Data

Sep. 17, 1991 [JP] Japan .............. 3-074441 U

[51] Int. Cl.$^6$ .............................................. B42C 9/00
[52] U.S. Cl. .................................... 156/477.1; 156/481
[58] Field of Search ............... 156/212, 213, 226, 227, 156/216, 285, 479, 488, 493, 486, 477.1–478, 481, 476

[56] References Cited

U.S. PATENT DOCUMENTS

| 2,458,864 | 1/1949 | Lindsay | 156/493 |
|---|---|---|---|
| 2,500,895 | 3/1950 | Davies | 156/216 |
| 2,808,099 | 10/1957 | Silverman | 156/479 |
| 3,089,536 | 5/1963 | Bolles | 156/479 |
| 3,147,172 | 9/1964 | Wesa et al. | 156/475 |
| 3,383,262 | 5/1968 | Ettore | 156/488 |
| 3,580,770 | 5/1971 | Dyal | 156/479 |
| 3,713,929 | 1/1973 | Bohasso et al. | 156/287 |
| 3,753,831 | 8/1973 | Copithorne | 156/493 |
| 4,059,477 | 11/1977 | Wesley | 156/479 |
| 4,441,949 | 4/1984 | Kiss | 156/216 |
| 4,564,408 | 1/1986 | Crumbach | 156/212 |
| 4,728,383 | 3/1988 | Kaller et al. | 156/285 |
| 5,000,805 | 3/1991 | Lowe | 156/285 |
| 5,080,742 | 1/1992 | Takahashi | 156/285 |
| 5,108,529 | 4/1992 | Shuert | 156/285 |
| 5,139,604 | 8/1992 | Mitchell | 156/479 |
| 5,176,777 | 1/1993 | Guilhem | 156/285 |
| 5,264,058 | 11/1993 | Hoagland et al. | 156/285 |

FOREIGN PATENT DOCUMENTS

| 295068 | 12/1988 | European Pat. Off. . | |
| 2626211 | 7/1989 | France . | |
| 0131225 | 7/1985 | Japan | 156/216 |
| 1275124 | 11/1989 | Japan | 156/216 |
| 2106831 | 4/1983 | United Kingdom . | |
| 2195940 | 4/1988 | United Kingdom . | |
| 90/00519 | 1/1990 | WIPO . | |

Primary Examiner—W. Gary Jones
Assistant Examiner—Mark DeSimone
Attorney, Agent, or Firm—Dickstein, Shapiro & Morin

[57] ABSTRACT

A bonding device and bonding process for a surface skin member of a vehicle interior component which can reliably fold back and secure a peripheral part of a surface skin member onto the reverse surface of a core member without involving any positional deviation between the core member and the surface skin member even when the width of the peripheral part is small. A block of elastic material is used for a lower die for mounting a surface skin member in a bonding station, and slide bars are arranged around the lower die in a peripheral part folding back station disposed adjacent to the bonding station for provisionally shaping the peripheral part of the surface skin member. Further, vertically moveable bars are arranged around an upper die for mounting the core member thereon for pressing the peripheral part of the surface skin member which has been provisionally shaped against the reverse surface of the core member.

3 Claims, 6 Drawing Sheets

BONDING DEVICE AND BONDING PROCESS FOR FABRICATING AN INTERIOR COMPONENT

This application is a continuation of application Ser. No. 07/871,423 filed Apr. 21, 1992, now abandoned.

TECHNICAL FIELD

The present invention relates to a bonding device for a surface skin member which can achieve a favorable alignment between the surface skin member and the core member, and an accurate folding back process of the peripheral part of the surface skin member in fabricating a vehicle interior component in which the surface skin member is bonded onto the surface of the core member and folded over an edge of the core member onto the reverse surface of the core member.

BACKGROUND OF THE INVENTION

Automotive interior components often consist of a core member having a capability to retain its shape, and a surface skin member bonded on the surface of the core member for soft feel and aesthetically attractive appearance.

In such a vehicle interior component, for the purpose of improving the aesthetic appearance of the peripheral part of the finished interior component, the peripheral part of the surface skin member is folded back onto the reverse surface of the surface core member.

Such a processing of the peripheral part of the surface skin member is carried out either manually or automatically by using a vacuum back holding device.

FIG. 11 illustrates the general structure of a vacuum back holding device. First of all, a core member 2 is positioned on a back holding die 1, and a bonding agent is applied to the core member 2. A surface skin member 3 is then placed over the surface of the core member 2, and a cover member 5 consisting of a stretched elastic sheet made of such materials as rubber is pressed against the reverse surface of the surface skin member 3 while vacuum suction is applied to the front surface of the surface skin member via vacuum suction holes 1a provided in the vacuum back holding die 1 so that the surface skin member 3 may be securely bonded over the surface of the core member 2 and the surface skin member 3 may be folded back over the edge of the core member 2 onto the reverse surface of the core member 2 by the elastic force of the elastic sheet 4.

If the steps of bonding the surface skin member 3 onto the core member 2, folding back and securing the peripheral part of the surface skin member 3 onto the reverse surface of the core member 2 are carried out manually, work efficiency is extremely low because the peripheral part of the surface skin member 3 needs to be folded back and secured onto the reverse surface of the core member 2 while applying a suitable amount of tension to each part, and the need for manual work prevents any further improvement in productivity.

When the process of vacuum back holding is employed, misalignment between the core member 2 and the surface skin member tends to occur. When the width of the peripheral part that is to be folded back is excessively small, the subsequent steps must be manually carried out, and the step of folding back the peripheral part of the surface skin member may not be achieved with a desired accuracy.

BRIEF SUMMARY OF THE INVENTION

In view of such problems of the prior art, a primary object of the present invention is to provide a bonding device and a bonding process for fabricating a vehicle interior component consisting of a core member and a surface skin member which are simple and reliable.

A second object of the present invention is to provide a bonding device and a bonding process for fabricating an aesthetically favorable vehicle interior component without involving any substantial complication.

A third object of the present invention is to provide a bonding device and a bonding process for economically fabricating a vehicle interior component having desired properties.

These and other objects of the present invention can be accomplished by providing a bonding device for fabricating a vehicle interior component consisting of a core member and a surface skin member covering a front surface of the core member and folded back over a reverse surface of the core member at a peripheral part of the surface skin member, comprising: a bonding station for bonding the surface skin member onto the front surface of the core member; a peripheral part folding back station for folding the peripheral part of the surface skin member over an edge of the core member, and securing onto the reverse surface of the core member; and conveying means for carrying an assembly of the core member and the surface skin member from the bonding station to the peripheral part folding back station; the bonding station being provided with a first die made of a block of resilient material for mounting the surface skin member thereon while the conveying means is provided with means for retaining the core member, and means for pushing the core member against the surface skin member mounted on the first die made of a block of resilient material; the peripheral part folding back station being provided with a second die for retaining the assembly of the core member and the surface skin member, first slide bar means for folding the peripheral part of the surface skin member over an edge of the core member, and second slide bar means for pressing the peripheral part of the surface skin member against the reverse surface of the core member.

The use of the first die made of a block of resilient material such as polyurethane foam allows the surface skin member to be secured onto the surface of the core member with a high positional accuracy thereby eliminating the need for manual intervention in the fabrication process which can be otherwise automated, and the aesthetic appearance of the surface skin member secured on the core member can be improved through elimination of creases and other defective conditions of the surface skin member.

Preferably, the first slide bar means comprises a plurality of first slide bars which are slidable across an edge of the core member; and the second slid bar means comprises a plurality of second slide bars which are slidable along and substantially in parallel with the reverse surface of the core member adjacent the edge of the core member.

The present invention further provides a bonding process for fabricating a vehicle interior component consisting of a core member and a surface skin member covering a front surface of the core member and folded back over a reverse surface of the core member at a peripheral part of the surface skin member, comprising the steps of: bonding the surface skin member onto the front surface of the core member; folding the peripheral part of the surface skin member over an edge of the core member; and pushing the peripheral part of the surface skin member onto the reverse surface of the core member.

Typically, a bonding agent is applied to the front surface and the peripheral part of the reverse surface of the core member before securing the surface skin member onto the core member. According to a preferred embodiment of the present invention, the core member consists of a shell member made of substantially hard synthetic resin material. Further, the interior component may comprise a pair of core members each defining a concave surface at the reverse surface thereof, the core members being joined together at an entire periphery of each of the core members so that the interior component may be constructed as a hollow member, so that a highly light weight and shock resistance interior component may be obtained.

BRIEF DESCRIPTION OF THE DRAWINGS

Now the present invention is described in the following with reference to the appended drawings, in which.

DETAILED DESCRIPTION OF THE PREFERRED EMBODIMENTS

Now an embodiment of the bonding device for a surface skin member of a vehicle interior component according to the present invention is described in the following with reference to the appended drawings.

Figure 1:
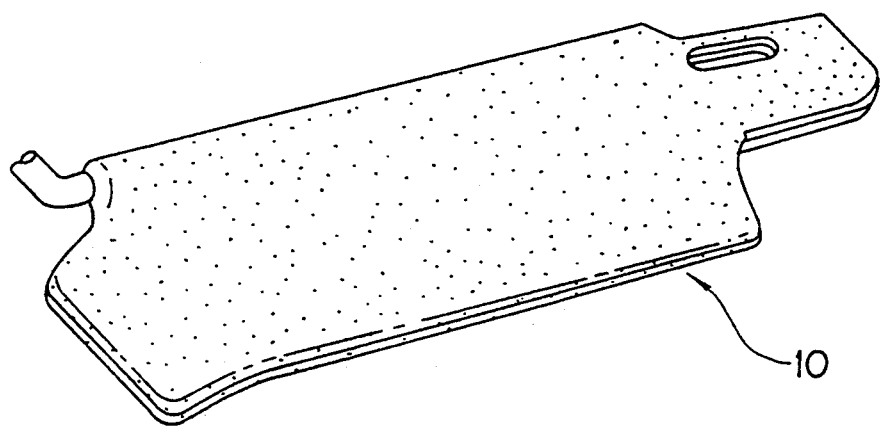
FIG. 1 is a perspective view of an automotive sun-visor fabricated with the bonding device of the present invention.
Figure 2:
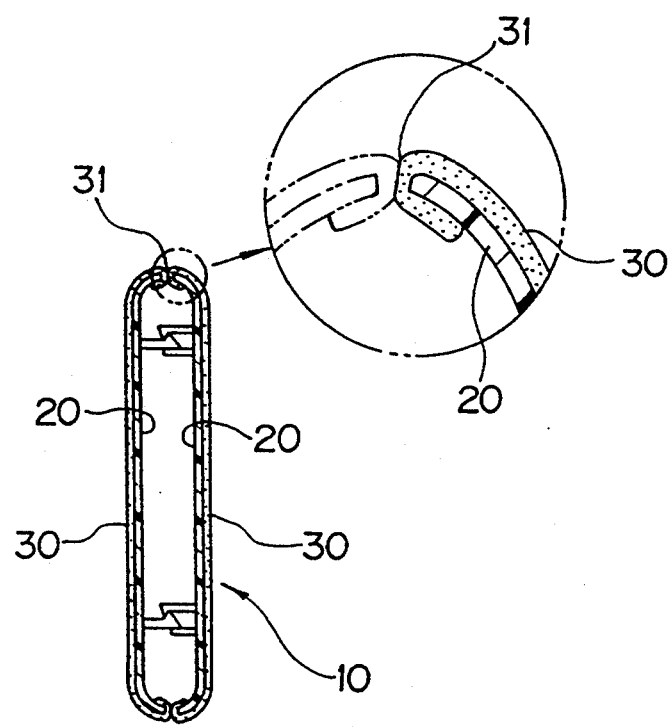
FIG. 2 is a sectional view showing the structure of the automotive sun-visor illustrated in FIG. 1.
Figure 3:
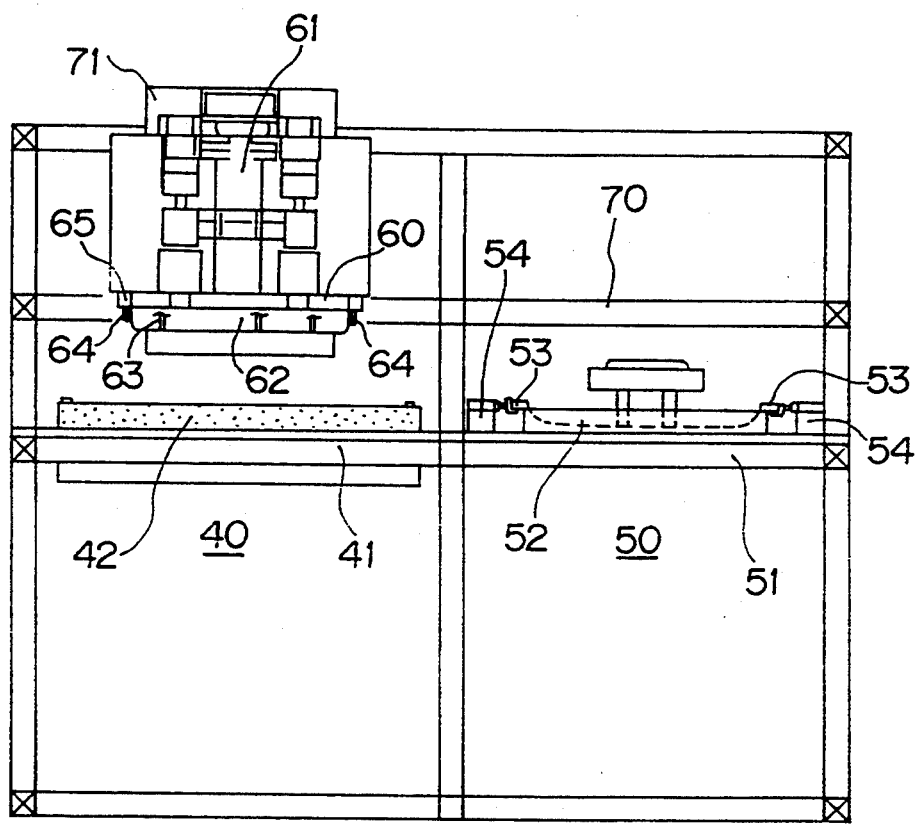
FIG. 3 is a sectional view showing an embodiment of the bonding device for a surface skin member according to the present invention.
Figure 4:
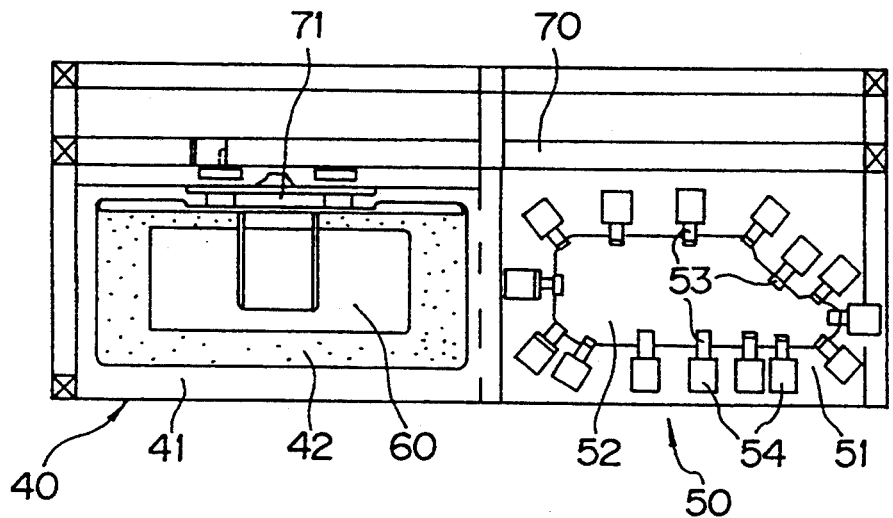
FIG. 4 is a plan view of the bonding device illustrated in FIG. 3.

FIGS. 1 and 2 are a perspective view and a sectional view showing an automotive sun-visor which is fabricated with the bonding device for a surface skin member according to the present invention, FIGS. 3 and 4 are a side view and a plan view showing the structure of the bonding device for a surface skin member according to the present invention, and FIGS. 5 through 10 are sectional views showing the operation of the bonding device.

Referring to FIGS. 1 and 2, an automotive sunvisor 10 fabricated with the bonding device according to the present invention is prepared by covering front surfaces of a pair of core members 20 fabricated as injection molded shells of synthetic resin material with surface skin members 30, and securely attaching the core members 20 to each other at their reverse surfaces and along their edges so that the sun-visor may be made highly light-weight with a desired shock absorbing capability.

The structure of this sun-visor requires the peripheral part of the surface skin member 30 to be folded over the edge of the core member 20 and secured onto the reverse surface thereof so as to define an aesthetically acceptable parting line 31.

Referring to FIGS. 3 and 4 showing the general structure of the bonding device for a surface skin member according to the present invention, this bonding device is provided with a bonding station 40 for bonding the surface skin member 30 onto the surface of the core member 20, and a peripheral part folding back station 50 for folding back a peripheral part of the surface skin member 30 onto the reverse surface of the core member 20, the two stations being arranged one next to the other.

The bonding station 40 is provided with a lower die 42 secured on a lower table 41 for mounting the surface skin member 30 thereon, and this lower die 42 is made of a block of resilient material such as foamed polyurethane defining a flat mounting surface.

The peripheral part folding back station 50 is likewise provided with a lower die 52 made of synthetic resin or aluminum secured on a lower table 51 for mounting the sun-visor assembly thereon, and a plurality of slide bars 53 connected to respective drive cylinders 54.

The slide bars 53 are used for provisionally forming the peripheral part of the surface skin member 30 in conformity with the reverse surface of the core member 20.

An upper table 60 is provided between the bonding station 40 and the peripheral part folding back station 50 so as to be reciprocated therebetween. The upper table 60 is connected to a slider 71 which laterally slides over a conveying rail 70 as seen in the drawing, and the upper table 60 is provided with a drive cylinder 61 for vertically moving the upper table 60, and an upper die 62 for mounting the core member 20 thereon. The upper die 62 is provided with vacuum suction holes 63 for retaining the core member 20 thereon.

The vertically moveable bars 64 are provided slightly inwardly of the periphery of the upper die 62, and are vertically actuated by drive cylinders 65 for pressing the peripheral part of the surface skin member 30 against the reverse surface of the core member 20.

The bonding device for a surface skin member according to the present invention is constructed as described above, and the operation thereof is now described in the following with reference to FIGS. 5 through 10.

Figure 5:
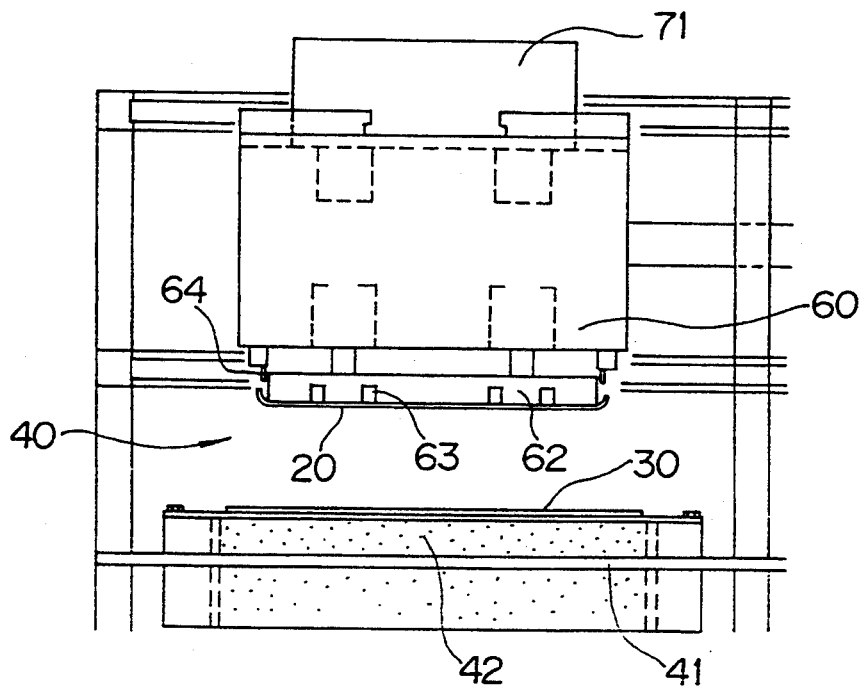
FIG. 5 is a sectional view showing the bonding device of FIG. 3 on which a core member and a surface skin member are mounted.
Figure 6:
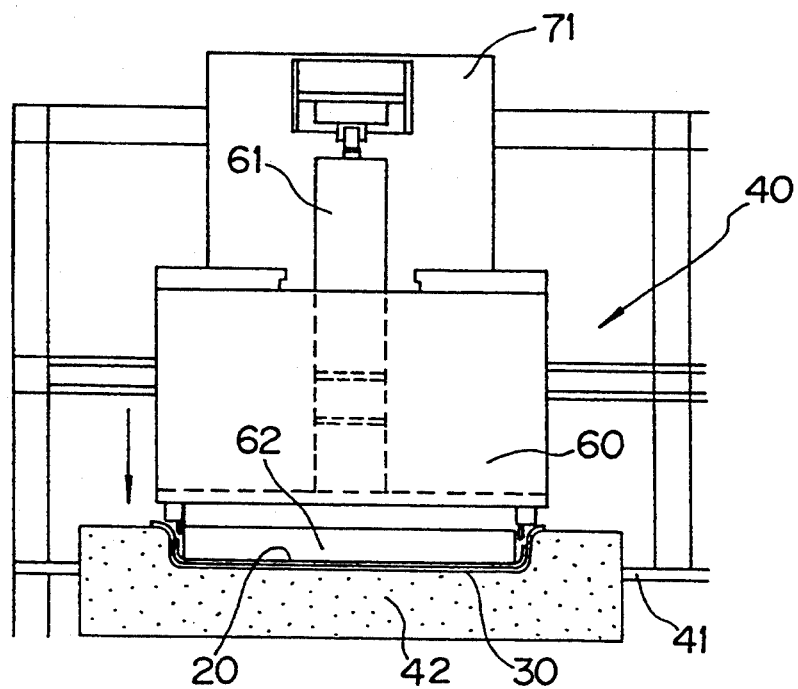
FIG. 6 is a sectional view showing the condition of the core member and the surface skin member pressed against each other in the bonding device.

Referring to FIG. 5, the surface skin member 30 is mounted on the upper surface of the lower die 42 in the bonding station 40, and the core member 20 is mounted on the upper die 62 positioned on the side of the bonding station 40 as shown in the drawing.

Vacuum suction is applied to the upper die 62 via the vacuum suction holes 63 so that the core member 20 may be retained on the upper die 62 by suction, and the front surface and the peripheral part of the reverse surface of the core member 20 are coated with a bonding agent.

Once the core member 20 and the surface skin member 30 are mounted on their respective dies, the drive cylinder 61 is activated so that the upper table 60 may be lowered until the upper die 62 is received by the lower die 42, and the surface skin member 30 may be bonded onto the front surface of the core member 20. Since the mounting surface of the lower die 42 is flat, the surface skin member 30 may be favorably conformed to the curved contour of the core member 20 thanks to the elasticity of the resilient material of the lower die 42 without creating any creases in the surface skin member 30.

Figure 7:
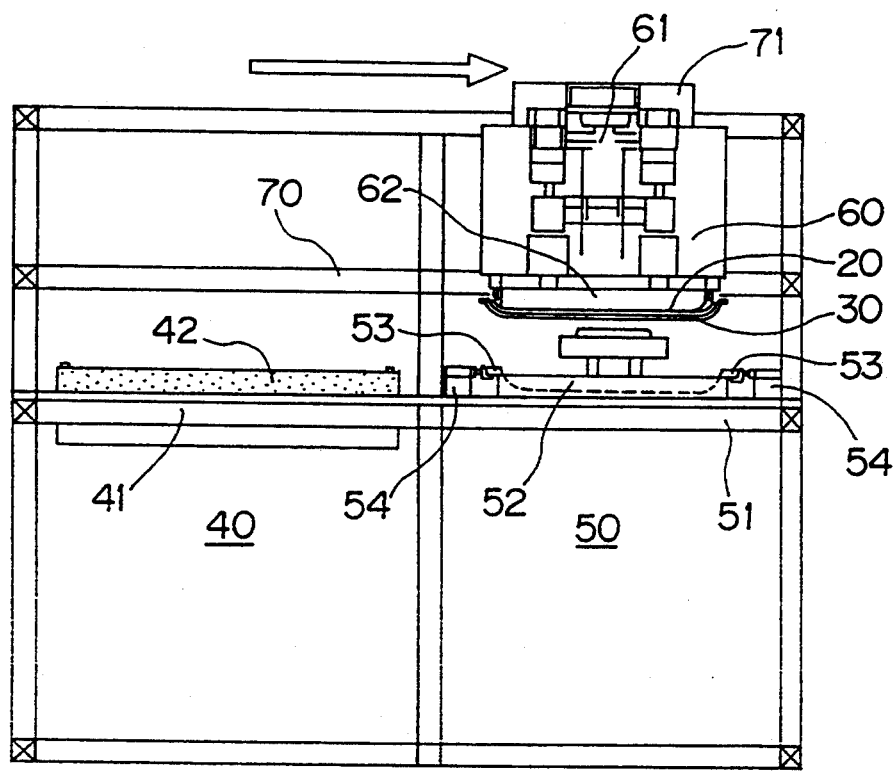
FIG. 7 is a sectional view showing the manner in which the upper table of the bonding device of FIG. 3 is moved from the bonding station to the peripheral part folding back station.

With the surface skin member 30 attached to the surface of the core member 20 (the peripheral part of the surface skin member 30 is still unprocessed in this stage), the upper table 60 is raised to its original position by the actuation of the drive cylinder 61. The slider 71 is slid along the rail 70 until the upper table 60 reaches the peripheral part folding back station 50 as illustrated in FIG. 7.

Figure 8:
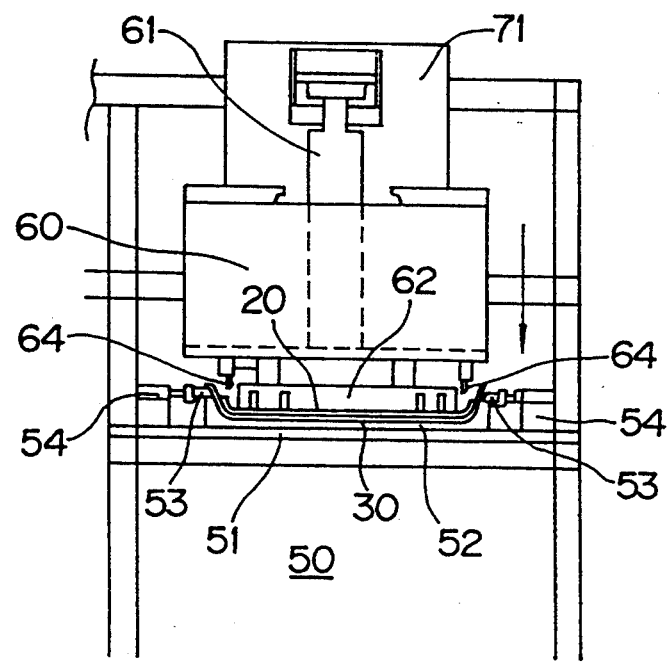
FIG. 8 is a sectional view showing the upper table in the bonding device of FIG. 3 positioned on the lower die of the peripheral part folding back station.

Thereafter, the upper table 60 is lowered by the actuation of the drive cylinder 61 as illustrated in FIG. 8 to mount the half-finished product on the lower die 52 in the peripheral part folding back station 50.

Figure 9:
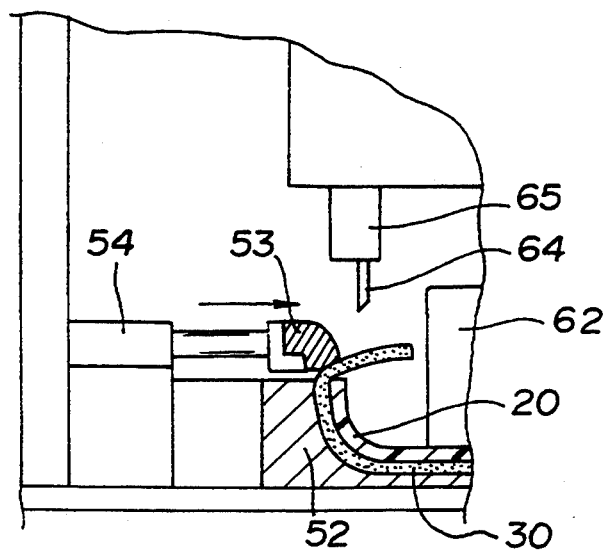
FIG. 9 is a sectional view showing the operation of the slide bars in the bonding device of FIG. 3.

Then, the core member 20 integrally joined with the surface skin member 30 is mounted on the lower die 52 as illustrated in FIG. 9, and the slide bars 53 arranged around the lower die 52 are slid in the direction indicated by the arrow in the drawing by activating the hydraulic cylinders 54 to carry out a preliminary shaping process for the peripheral part of the surface skin member 30 by pressing it inwardly.

Figure 10:
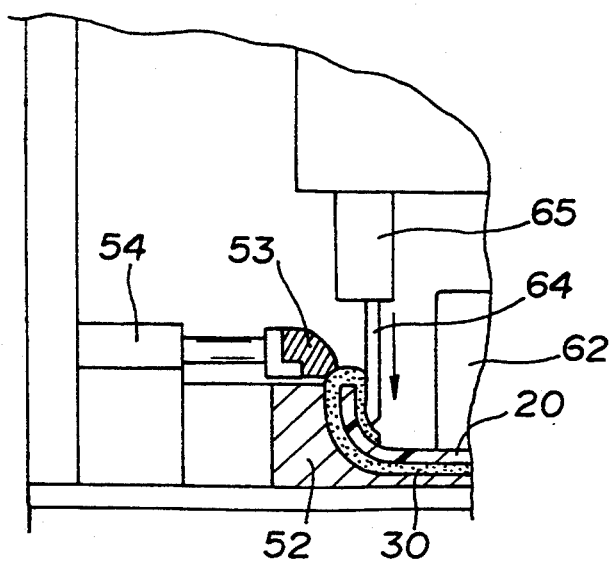
FIG. 10 is a sectional view showing the operation of the vertically moveable bars in the bonding device of FIG. 3.
Figure 11:
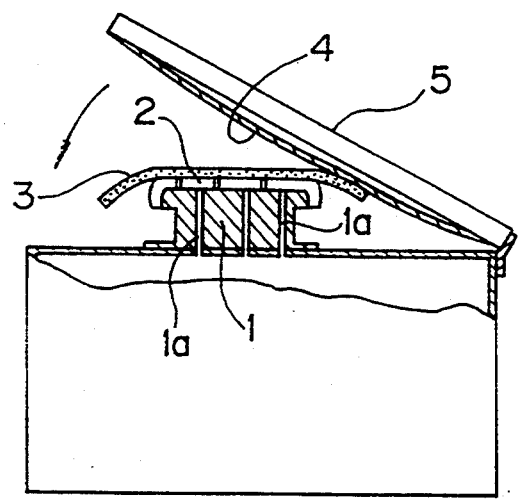
FIG. 11 is a sectional view showing the structure of a conventional vacuum back holding device.

Then, with the slide bars 53 kept engaged to the surface skin member 30 at the end of their sliding movement, the vertically moveable bars 64 are lowered by the cylinders 65 for vertical movement to press the peripheral part of the surface skin member 30, which has been subjected to the preliminary shaping process, for a certain time period against the reverse surface of the core member 20 as illustrated in FIG. 10. Following this processing of the edge of the surface skin member 30, the slide bars 53 and the vertically moveable bars 64 are retracted to their original positions.

In this way, by using the bonding device of the present invention, positional deviation between the core member 20 and the surface skin member 30 can be avoided, and even when the peripheral part of surface skin member is small in width it is still possible to securely attach the peripheral part of the surface skin member 30 onto the reverse surface of the core member 20 with the slide bars 53 and the vertically moveable bars 64.

The above described embodiment was directed to the process of bonding the peripheral part of the surface skin member 30 onto the resin core member 20 of an automotive sun-visor 10, but the present invention is not limited to this application and can be applied to any other interior components such as door trims, rear corner trims or other interior component as long as the peripheral part of a surface skin member is required to be folded back onto the reverse surface of the core member.

As described above, the bonding device for a surface skin member of a vehicle interior component according to the present invention offers the following specific advantages.

(1) According to the bonding device of the present invention, since the surface skin member is mounted on a lower die made of an elastic member having a flat mounting surface and bonded to the surface of the core member by pressing the surface skin member against the core member and burying the core member in the lower die, there will be no positional deviation between the core member and the surface skin member when pressing the surface skin member against the core member, the elasticity of the lower die allows the surface skin member to favorably conform to the curved contour of the core member without creating any creases in the surface skin member so that the appearance of the finished product is prevented from being impaired by the shifting of the surface skin member and creation of creases in the surface skin member, and the productivity can be improved.

(2) According to the bonding device of the present invention, since the peripheral part of the surface skin member is provisionally formed by the slide bars, and is folded back by the vertically moveable bars so as to favorably conform to the reverse surface of the core member, the surface skin member can be securely attached to the reverse surface of the core member even when the width of the peripheral part of the surface skin member is small, and the productivity can be improved because the need for manual work in case the width of the peripheral part is excessively small may be eliminated.

Although the present invention has been described in terms of a preferred embodiment thereof, it is obvious to a person skilled in the art that various alterations and modifications are possible without departing from the scope of the present invention which is set forth in the appended claims.

What we claim is:

1. A bonding device for fabricating a vehicle interior component comprising a core member and a surface skin member covering a front surface of said core member and folded back over an edge and a concave reverse surface of said core member at a peripheral part of said surface skin member, said device comprising:

a bonding station for bonding said surface skin member onto said front surface of said core member;

a peripheral part folding back station for folding said peripheral part of said surface skin member over said edge of said core member and securing said peripheral part of said surface skin member onto said concave reverse surface of said core member; and conveying means for carrying an assembly of said core member and said surface skin member from said bonding station to said peripheral part folding back station;

wherein said bonding station includes a first die made of a block of resilient material for mounting said surface skin member thereon and said conveying means includes means for retaining said core member and means for pushing said core member against said surface skin member mounted on said first die made of a block of resilient material; and wherein said peripheral part folding back station includes a second die for retaining said assembly of said core member and said surface skin member, a plurality of first slide bars for folding said peripheral part of said surface skin member over said edge of said core member which are slidable across an edge of said core member, and a plurality of second slide bars for pressing said peripheral part of said surface skin member against said concave reverse surface of said core member which are slidable along and substantially in parallel with said concave reverse surface of said core member adjacent said edge of said core member.

2. A bonding device according to claim 1, wherein said first and second dies each comprise lower dies, and said conveying means comprises an upper die for retaining said core member.

3. A bonding device according to claim 1, wherein said upper die includes vacuum suction holes for retaining said core member thereon.

* * * * *